3,720,529
CEMENTS

Russell T. Jordan, Denver, Colo.
(180 S. Xenia St., Enon, Ohio 45323)
No Drawing. Continuation-in-part of application Ser. No. 576,835, Sept. 2, 1966. This application May 18, 1970, Ser. No. 38,603

Int. Cl. C04l 7/02
U.S. Cl. 106—90      9 Claims

---

Cements having a variety of improved properties including reduced efflorescence and improved appearance when molded can be prepared by adhering to a portion of the surface of a majority of the unset cement particles a surface-tension reducing agent and/or a dispersant which effects dispersion by establishing a common charge on each of the cement particles without substantial reduction in the size of the particles. Preferably, the organic matter is adhered to the cement particles by impinging a stream of one of the particles on a stream of the other and preferably both a surface-tension reducing agent and a dispersant are utilized.

CROSS REFERENCES

This application is a continution-in-part of U.S. Pat. application Ser. No. 576,835, filed Sept. 2, 1966, now abandoned and is a companion case to my co-pending U.S. application Ser. No. 38,546, filed May 18, 1970 and titled "Cement Having Improved Color."

BACKGROUND OF THE INVENTION

The invention relates to coated unset cements and set cements having improved properties and processes for their preparation. The improved properties include, but are not limited to, reduced efflorescence and improved appearance when molded.

The most probable area for the discovery of United States patents relating to the subject matter of this invention is found in Class 106. Subclasses 90 and 95 are probably the most pertinent subclasses.

Over the years, many types of additives have been used to prepare a variety of cements for a number of purposes. G. R. Tucker, U.S. Pats. 1,972,207 and 2,141,569 teaches that certain sulfonic acids and/or their condensation products improve plasticity of the mixed but unset cement and strength and color intensity in colored cements. H. R. Stark, U.S. Pat. 2,300,656, used oleagenous materials as grinding aids. E. W. Scripture, U.S. Pat. 2,305,113, added stearic acid to cement as a waterproofing agent along with an emulsifier, for example triethanol amine. T. H. Harris, U.S. Pat. 3,097,955, suggested that oleagenous materials in combination with sulfonates improved "workability" of unset cement. Many other references could be cited listing various approaches to the improvement of cements. Concomitantly, the additives have been mixed with the cement clinker prior to grinding, and to the cement prior to the addition of makeup water. Additives have also been included in the makeup water. However, in spite of the plethora of literature on the subject, the industry continues its search for better cements and is particularly plagued by efflorescence.

SUMMARY OF THE INVENTION

The combination of the use of additives, and coaddilive in the preferred embodiment, with coating of the cement particles without any substantial reduction in the size of the cement particles provides a cement having a variety of improved properties.

The verb "coat," as used herein, is the adhering of additive agent to ground cement particles so as to partially cover a substantial percentage of the cement particles. Minor portions of the particles can be uncoated or completely coated. The coated cement particles are then mixed with water and set by allowing the mixture to remain quiescent until a solid mass is formed.

"Additive agent" is used herein to include either or both of "additive" and "coadditive." "Additive" is a surface-active agent which primarily acts to reduce surface tension between the cement particles and water. "Coadditive" is a surface-active agent which primarily imparts a common charge to each of the particles. Coadditives are commonly called "dispersants" in a number of industries. The use of additive is much preferred where only one species of additive agent is used.

DESCRIPTION OF THE PREFERRED EMBODIMENTS

Preferably, one of the cement particles or additive agent are impinge on the other or each other with sufficient force to adhere additive agent to the cement. While mixing of this type is preferred, other types of mixing can be utilized to coat the cement particles. Mixing of the type which would cause substantial grinding, i.e., size reduction of the cement particles, is not desired. Poor results are obtained where grinding is carried out because grinding causes cement particle fines to coat the additive agent. Alternately, the uniform distribtuion of solid additive agent among the cement particles without the required coating, i.e., adherence, taking place results in little or no improvement. This latter type of mixing may occur with drum-type mixers, planetary-type vertical mixers, and paddle mixers because good results are difficult to obtain with these type mixers.

The percentage of particles coated varies with the amount of improvement desired. The greater the percentage of particles coated and the greater amount of surface coated per particle, the greater the improvement exhibited. Almost complete elimination of efflorescence and improvement in surface appearance is obtained when 80–90% of the cement particles are at least 65–75% coated and only on the order of about 15%, by weight, of this amount is totally coated.

As only 1 to 2% additive agent, by weight, is sufficient, the coating should be substantially uniform throughout a batch of cement though the surface coated on an individual particle can range from no coating to total coating within the batch.

A major portion of the cement particles are coated to provide the preferred improved cements of this invention. Preferably, at least about 60% and more preferably, 75% of the particles are coated. Almost total elimination of efflorescence is obtained at 85–90% coated particles. Preferably no more than 15–25% of the coated particles are ever totally or almost totally covered. As much as 60–65% total coating of the particles can be tolerated for some uses, however.

Solid additive agent in the form of small (0.01 to 10 micron) particles is preferred though fluid additive agent, preferably in droplet form, can be used. The resulting mixture of additive agent and cement should be substantially dry and free flowing unless immediate use is contemplated. Any water used should not react to set substantially the cement particles. Preferably, no more than about 3 to 5%, by weight, of the cement-additive agent mixture, water need be used and preferably only 1 to 2% is used where the mixture is to be stored. Greater amounts of water can be used where makeup water is to be added immediately and the cement allowed to set. The amount of water used will vary with the additive agent, etc. The amounts of increased efflorescence, reduction in resistance to corrosive agents and freeze-thaw damage, and sometimes decreased strength resulting from excessive water and/or additive agent are readily determined by routine testing.

While the use of only 1 to 2% additive agent is preferred, I can use from 0.5 to about 3% or more additive agent with good results. However, it should be noted that, at higher additive agent concentrations, there is a tendency for the organic matter in the coating to weaken the cement. Possibly too many particles are totally coated. The use of additive agent in amounts prescribed in the preferred range, as indicated previously, often causes an increase in cement strength and the formation of a smoother surface in a molded, precast structure rather than a reduction thereof.

A variety of organic additive agent can be used in preparing the improved cements of this invention. The additive agent can be water solube, soluble in water only when present with a cosolvent, or dispersible in water in micelar form. Preferably, the additive agent does not substantially alter the pH of the setting cement from that pH which the setting cement would optimally have in the absence of the additive. Buffering agents can be added to aid in pH control. Bactericides, fungicides, antioxidants, etc., can also be added where necessary.

While only one additive agent will provide an improved cement, the combination of additive and coadditive provides a surprisingly enhanced effect and the use of a plurality of additive agent species is preferred. Thus, when 100 grams of ASTM efflorescing (masonry) cement is mixed with one gram of sodium stearate in a Tyler portable sieve shaker, manufactured by the W. S. Tyler Company, Cleveland, Ohio, visual inspection indicates about a 60% reduction in efflorescence. The same weight of a mixture of equal amounts of sodium stearate and a Tamol (Rohm and Haas Company dispersant containing a sodium salt of a sulfonated formaldehyde condensate) virtually eliminates efflorescence.

The additives useful in reducing surface tension are organic and have both polar and nonpolar units in the molecule. Preferably, these additives are soluble in water or form micelles therein. The preferred additives are the alkali metal fully saturated fatty acid soaps having 12 to 22 carbon atoms. The most preferred surface active organic additives are sodium stearate and stearic acid.

The usual particle dispersants of industry which impart a common electrical charge to the particles being dispersed are preferred as coadditives with surfactant-type additives. Commercial dispersants include the sulfonated naphthalene-formaldehyde condensates and copolymers of maleic anhydride and methylvinyl ether. The best combinations are readily determined by routine testing. Most preferred of the coadditives for use in combination with the fatty acid surfactants are the sulfonate-formaldehyde condensation products.

Operative types of additives and coadditives include the water-soluble alkylaryl sulfonates, the alkali and alkaline earth metal soaps, the water-insoluble fatty acid soaps, various sulfonic acid aldehyde condensation products of various organic acids, etc. Additives not normally considered "surfactants" include polybasic acids, etc. Surfactant additives should have at least 8, and preferably at least 12, carbon atoms in an alkane portion of the molecule. Polybasic acids can contain as few as 2 to 3 carbon atoms but preferably contain at least 6 carbon atoms. Here again, the use of a plurality of additive species provides an enhanced effect. For example, adipic acid produces a reduction in efflorescence, but the effect is increased appreciably through the use of an equal amount of a mixture of adipic and malonic acids.

As previously indicated, additive agent is readily mixed into the neat cement while dispersed in small amounts of water. Thus, droplets of one gm. of liquid (Tamol 721 suspended in 100 g. $H_2O$) are sprayed into dry neat cement to form a dry cement powder having free-flowing properties capable, when mixed with makeup water, of forming a cement exhibiting substantially no efflorescence. Mixing, in this instance, is preferably accomplished in a mixer where the two streams of particles are centrifugally forced into fine streams which impinge to cause mixing.

Cements with which this invention are useful are termed portland type cements and include the usual commercial cements used to make up mortar, by hydraulic cement, etc. These include the following types: uncolored gray or white portland cements, pozzolanic cement supersulfate cements, and high alumina cements. Pereferably, this invention is practiced with normal portland cement.

The Flash Mixer, manufactured by the J. H. Day Company of Cincinnati, Ohio, is preferred for adhering additive agent to the cement. The Flash Mixer utilizes two horizontal discs rotating in opposite directions at 3600 r.p.m. to propel streams of particles against one another. Materials to be mixed are introduced into the top of the unit and fall onto the counter rotating discs which impart a rotational component to the movement of the particles to impinge one particle stream on another before the coated cement passes downwardly through an exit chute for bagging or bulk storage.

The mixer is, with slight modification, also quite useful for grinding oversize particles of cement. Three tons of improved cement can be readily mixed per hour by all models C, CS, CD 18–350 Flash Mixer or Centri-Flo.

The above generally teaches the invention. This teaching is amplified by the following specific examples which are not intended to be limiting in any way.

EXAMPLE I

A test mortar is mixed in accordance with ASTM C–12 Subcommittee 11, Experimental procedure for Pilot Study for the Efflorescence Test Procedure. The mortar mix contains 1080 gm. of 230 grade sand, 1080 gm. graded Ottawa sand and 630 gm. cement containing 1 to 3%, by weight, of additive. Minimum water is added to achieve plasticity. The mixed mortar is placed between the ends of test bricks with a ½ inch excess at the joint. After curing for three days, the cemented bricks are placed in a shallow pan of water. Efflorescing material migrates onto the brick during the 14-day soak in one inch of water. The test sample is compared against standard photographs at the end of the test. Scoring is "severe," "moderate," or "slight." Mixtures of cement and the described additive(s) mixed with a Tyler portable sieve shaker score as indicated below in the above-discussed test.

| | Score | Improvement |
|---|---|---|
| Single additive (1% by weight): | | |
| Stearic acid | Slight | Great. |
| Oleic acid | Moderate | Moderate. |
| Chromium naphthenate | do | Do. |
| Adipic acid | Moderate-severe | Slight. |
| Gluconic acid | do | Do. |
| Myristic acid | Moderate | Moderate. |
| Capric acid | do | Do. |
| Linoleic acid | Moderate-severe | Slight. |
| Calcium stearate | Moderate | Moderate. |
| Sodium stearate | Slight | Great. |
| Coadditive: | | |
| Tamol SN | Moderate-severe | Slight. |
| Gantrez AN-169 | do | Do. |
| Additive agent mixture (1% by weight): | | |
| Stearic acid-Tamol 721 | Very slight | Very great. |
| Stearic acid-Tamol SN | do | Do. |
| Adipic acid-Tamol SN | Slight | Great. |
| Linoleic acid-Tamol SN | Slight-moderate | Moderate. |
| Lauric acid-Tamol SN | Slight | Slight. |
| Stearic acid-Gantrez AN | Very slight | Very great. |
| Oleic acid-Gantrez AN | Slight | Great. |
| Adipic acid-Gantrez AN | Moderate | Moderate. |
| Lauric acid-Gantrez AN | do | Do. |
| Tamol SN-Gantrez AN | Moderate-severe | Slight. |
| Chromium naphthenate-Gantrez AN. | Slight-moderate | Moderate. |

NOTE: Gantrez copolymers are of maleic anhydride and methyl vinyl ethers are manufactured by the General Aniline Film Corp.

EXAMPLE II

White cement, gray cement, and a pozzolanic cement are mixed and tested by the method of Example I with one percent of a mixture of 50% stearic acid and 50% Tamol 721. Efflorescence is very slight to non-existent in each case.

EXAMPLE III

A series of replicate experiments was carried out to compare the effect of "adhering" additive to cement with the processes of the prior art in which particles size was reduced appreciably in the presence of additives, the additives were included in the makeup water used to make the cement, and paddle mixing was used with little or no "adherence."

Each series was composed of three replicate experiments. The data in the table is a rounded off average of the results of the three experiments. In the "A" series, "adherence" was accomplished in a Tyler portable sieve shaker in a 9.5" diameter by 2" deep pan containing steel "balls" (of various sizes and shapes). In the "B" series, a ball mill was used to grind the mixture of particles and additives to a smaller size. In the "C" series, a Hobart mixer (Model H–50) was used to mix the ingredients. In the "D" series, the additives were added to the makeup water. Type one portland cement, 495 grams, Ottawa Sand ASTM C–109 graded, 1361.25 grams, and 23 grams of water were utilized. Mixing time for adherence was ten minutes, grinding time was five hours, and paddle mixing time was 15 minutes.

The cement, sand and water were mixed as described and placed in two-inch clear plastic cubes. In each of the replicates, one percent by weight Tamol SN and one percent sodium stearate were incorporated in the cement product.

Resistance to acids and bases was then tested. The cure time of the cement blocks for this testing was 28 days.

One millimeter each of one or more nitric acid was placed on the molded face of a cube. Pitting was detectable with a microscope having an ocular at 10× magnification, and later with the unaided eye, after the passage of the number of days set out in the following table.

| Acid or base | HNO₃ | H₂SO₄ | NaOH |
|---|---|---|---|
| Test A | 35 | 38 | 44 |
| Test B | 20 | 22 | 30 |
| Test C | 26 | 29 | 28 |
| Test D | 15 | 10 | 16 |

An examination of the molded cubes with a Petrographic microscope at 50× magnification showed the surfaces of the "A" series to have no crevices or voids, the surfaces of the "B" and the "C" series to have occasional pitting and voids although the series had a glassy finish and the control to have considerably heavier pitting. The cubes were all cured while sealed in polyethylene bags at ambient room temperatures.

It was noted that the addition of cement over the amount fixed by replication improved the appearance of the control which initially had the appearance of a flat paint. In scoring the surfaces from "0" with a perfect glasslike surface to "5" with a surface having the appearance of flat paint, the "A" series had a zero rating, the "B" series a 2 to 3 rating, the "C" series a 2 rating, and the "D" series a 4 to 5 rating.

The setting time of the "A" series averaged one hour for initial set and 1.7 hours for final set, the "B" series averaged 3 hours for initial set and 4 hours for final set, the "C" series averaged 1.9 hours for initial set and 3.5 hours for final set, and the "D" series averaged 2.5 hours for initial set and 5.2 hours for final set.

The stability of cement cubes to freeze-thaw was then tested through ten cycles of freezing and thawing as per Part 10 ASTM C–290 Standards, "Concrete and Mineral Aggregates." The procedure was modified, however, by using weight loss as a criteria for resistance to freezing and thawing. The weight loss of the "A" series was 2.2%, by weight, the "B" series 6.8%, by weight, the "C" series was 3.1%, by weight, and the "D" series was 12.2% by weight.

EXAMPLE IV

Four series of experiments were run and each experiment was composed of three replicates. In the first series (Table I), "adherence" was accomplished in a Tyler portable sieve shaker. In the second series (Table II), mixing was accomplished in a ball mill. In the third series (Table III), mixing was accomplished with a paddle mixer. In the fourth series (Table IV), the additive was mixed into the makeup water. The equipment used was the same as Example III.

In each of the lines "A" of the tables, the replicates contain one percent by weight Tamol SN and one percent sodium stearate. In lines "B" of the tables, the compositions contained two percent by weight Tamol SN. In lines "C" of the tables, the cement compositions contained two percent by weight sodium stearate. The compositions of lines "D" of the tables were control cements with no additive. Each control sample contained additional cement so that the percentage composition of water in the final mix would be constant. The set cement was compared for efflorescence using ASTM Standards and Procedures (see Example I).

The data indicates that the "adherence" process completely eliminated efflorescence with respect to the preferred embodiment and the embodiment using alkali metal fatty acid soap. The overall results, considered in terms of throughput time and efflorescene reduction was unexpectedly better than any other method used. This data is set out in Table I.

TABLE I

| | Cement in grams | Pigment, percent | Tamol SN, percent | Na Stearate, percent | Shaker time, minutes | Water, cc. | Efflorescence |
|---|---|---|---|---|---|---|---|
| A | 495 | 3 | 1 | 1 | 15 | 22 | 0 |
| B | 495 | 3 | 2 | 0 | 15 | 22 | 2 |
| C | 495 | 3 | 0 | 2 | 15 | 22 | 0 |
| D | 497 | 3 | 0 | 0 | 15 | 22 | 2 |

The data of Table II show that efflorescence was eliminated with ball milling utilizing an alkali metal soap. Efflorescence was present when the soap and coadditive were used.

TABLE II

| | Cement in grams | Pigment, percent | Tamol SN, percent | Na stearate, percent | Grinding time, hours | Water, cc. | Efflorescence |
|---|---|---|---|---|---|---|---|
| A | 495 | 3 | 1 | 1 | 5 | 22 | 1 |
| B | 495 | 3 | 2 | 0 | 5 | 22 | 2 |
| C | 495 | 3 | 0 | 2 | 5 | 22 | 0 |
| D | 497 | 3 | 0 | 0 | 5 | 22 | 3 |

When paddle mixing was used, efflorescence occurred in every instance as indicated by Table III.

TABLE III

| | Cement in grams | Pigment, percent | Tamol SN, percent | Na stearate, percent | Paddle time, minutes | Water, cc. | Efflorescence |
|---|---|---|---|---|---|---|---|
| A | 495 | 3 | 1 | 1 | 15 | 22 | 1 |
| B | 495 | 3 | 2 | 0 | 15 | 22 | 2 |
| C | 495 | 3 | 0 | 2 | 15 | 22 | 1 |
| D | 497 | 3 | 0 | 0 | 15 | 22 | 2 |

Efflorescence was quite apparent, as indicated in Table IV, when the additives were added to the makeup water.

TABLE IV

| | Cement in grams | Pigment, percent | Tamol SN, percent | Na stearate, percent | Water, cc. | Efflorescence |
|---|---|---|---|---|---|---|
| A | 495 | 3 | 1 | 1 | 22 | 1 |
| B | 495 | 3 | 2 | 0 | 22 | 2 |
| C | 495 | 3 | 0 | 2 | 22 | 1 |
| D | 497 | 3 | 0 | 0 | 22 | 3 |

What is claimed is:

1. The process of forming a substantially dry, unset cement which, when set by contact with water, will exhibit low efflorescence comprising forceably contacting substantially dry, free flowing particles of portland type cement with a combination of sufficient surface-tension reducing additive and common electrical charge imparting co-additive to adherently coat only a part of the surface of a major portion of the particles with additive, without substantial reduction in the size of the cement particles.

2. The process of claim 1 wherein the cement particles are coated by impinging additive and coadditive and cement particles on the other.

3. Th process of claim 1 wherein the additive is stearic acid or sodium stearate.

4. The process of claim 2 wherein the additive is stearic acid or an alkali metal salt thereof and the coadditive is a naphthalene sulfonate-formaldehyde condensation product and the combined weight of the additive agent is about 0.5 to about 3%, by weight, of the cement.

5. The process of claim 2 wherein the additive is stearic acid and the coadditive is a naphthalene sulfonate-aldehyde condensation product.

6. The process of claim 2 wherein the additive is stearic acid or an alkali metal salt thereof and the coadditive is a naphthalene sulfonate-formaldehyde condensation product and the combined weight of the additive agent is about 0.5 to about 3%, by weight, of the cement.

7. The process of claim 2 wherein at least about 75% of the cement particles are partially coated with additive agent and no more than about 15-20% of the particles are totally coated.

8. The process of claim 2 wherein about 85-90% of the cement particles are at least about 65-75% coated with additive agent and only on the order of about 15% of the particles are totally coated, with about 1-2%, by weight of the cement, additive agent.

9. The process of claim 2 wherein the additive is an alkali metal soap of a fatty acid containing 12 to 22 carbon atoms or the free acid per se and the coadditive is a naphthalene sulfonate-formaldehyde condensation product.

References Cited

UNITED STATES PATENTS

| 3,331,905 | 7/1967 | Hint | 264—122 |
| 3,097,955 | 7/1963 | Harris | 106—95 |
| 2,927,862 | 3/1960 | Welch | 106—97 |
| 2,934,445 | 4/1960 | Jones et al. | 106—95 |
| 2,305,113 | 12/1942 | Scripture | 106—95 |
| 1,972,207 | 9/1934 | Tucker et al. | 106—90 |

JAMES E. POER, Primary Examiner

U.S. Cl. X.R.

106—95, 97